(12) United States Patent
Sung (10) Patent No.: US 6,915,796 B2
(45) Date of Patent: Jul. 12, 2005

(54) SUPERABRASIVE WIRE SAW AND ASSOCIATED METHODS OF MANUFACTURE

(76) Inventor: Chien-Min Sung, 64 Chung-San Road, Yang-Ko, Taipei County (TW), 23911

( * ) Notice: Subject to any disclaimer, the term of this patent is extended or adjusted under 35 U.S.C. 154(b) by 0 days.

(21) Appl. No.: 10/627,446

(22) Filed: Jul. 25, 2003

(65) Prior Publication Data

US 2004/0107648 A1 Jun. 10, 2004

Related U.S. Application Data

(63) Continuation-in-part of application No. 10/254,057, filed on Sep. 24, 2002, now Pat. No. 6,830,598.

(51) Int. Cl.⁷ ................................................. B28D 1/08
(52) U.S. Cl. ..................... 125/21; 125/12; 125/30.02; 125/36; 125/39; 451/296; 451/526; 451/532; 451/534
(58) Field of Search ....................... 125/12, 21, 30.02, 125/36, 39; 451/296, 526, 532, 534

(56) References Cited

U.S. PATENT DOCUMENTS

| | | | |
|---|---|---|---|
| 3,650,714 A | 3/1972 | Farkas | |
| 4,770,907 A | 9/1988 | Kimura | |
| 4,916,869 A * | 4/1990 | Oliver | ............ 51/293 |
| 4,943,488 A | 7/1990 | Sung et al. | |
| 5,024,680 A | 6/1991 | Chen et al. | |
| 5,030,276 A | 7/1991 | Sung et al. | |
| 5,037,704 A | 8/1991 | Nakai et al. | |
| 5,080,086 A | 1/1992 | Tomlinson et al. | |
| 5,143,523 A | 9/1992 | Matarrese | |
| 5,647,878 A | 7/1997 | Iacovangelo et al. | |
| 5,715,806 A | 2/1998 | Tonegawa et al. | |
| 5,783,316 A | 7/1998 | Colella et al. | |
| 5,855,314 A * | 1/1999 | Shiue et al. | ............ 228/124.5 |
| 6,070,570 A | 6/2000 | Ueoka et al. | |
| 6,102,024 A * | 8/2000 | Buljan et al. | ................ 125/21 |
| 6,679,243 B2 * | 1/2004 | Sung | ........................... 125/12 |

* cited by examiner

Primary Examiner—Joseph J. Hail, III
Assistant Examiner—Shantese McDonald
(74) Attorney, Agent, or Firm—Thorpe North & Western, LLP (57) ABSTRACT

A superabrasive wire saw having a plurality of individual coated superabrasive particles attached to a wire with an organic binder is disclosed and described. The superabrasive particle can be coated with a solidified coating of a molten braze alloy that is chemically bonded to the superabrasive particle. The organic binder can optionally contain filler materials and/or an organometallic coupling agent to improve the retention of coated superabrasive particles. The resulting superabrasive wire saws can be produced having diameters of less than 0.5 mm which significantly reduce kerf loss. Various methods for making and using such a superabrasive wire saw are additionally disclosed and described.

31 Claims, 2 Drawing Sheets

SUPERABRASIVE WIRE SAW AND ASSOCIATED METHODS OF MANUFACTURE

CLAIM OF PRIORITY

This application is a continuation-in-part of U.S. patent application Ser. No. 10/254,057, filed Sep. 24, 2002, now U.S. Pat. No. 6,830,598 which is incorporated herein by reference.

FIELD OF THE INVENTION

The present invention relates to wire saws that incorporate superabrasive materials, and methods for the production and use thereof. Accordingly, the present invention involves the fields of chemistry, physics, and materials science.

BACKGROUND OF THE INVENTION

A variety of abrasive and superabrasive tools has been developed over the past century for performing the general function of removing material from a workpiece. Actions such as sawing, drilling, polishing, cleaning, carving, and grinding, are all examples of material removal processes that have become fundamental to a variety of industries.

A number of specific material removal applications require the use of superabrasive tools. In these cases, the use of conventional abrasive tools may be infeasible due to the nature of the workpiece, or the surrounding circumstances of the process. For example, activities such as cutting stone, tile, cement, etc. are often cost prohibitive, if not impossible to accomplish, when attempted using a conventional saw blade. Additionally, the economy and performance of other material removal activities may be increased when using superabrasive tools, due to their greater durability.

Wire saws containing superabrasive particles can provide many benefits over conventional cutting tools. For example, wire saws can cut almost any thickness while circular saws, and the like, are limited to a cutting depth of less than the radius of the blade. Further, the flexibility of superabrasive wire saws allows for cutting of straight or profiled cutting paths. Conventional wire saws are produced by sliding steel beads over a metal wire or cable. The beads are typically separated by spacers and the metal wire is protected by plastic or rubber to prevent corrosion. Such beads are covered by abrasive or superabrasive particles which are commonly attached by either electroplating or sintering. Electroplated beads generally contain a single layer of abrasive particles which are mechanically bonded to the bead. This mechanical bonding allows for premature loss of abrasive particles, thus shortening the useful life of the wire saw. Sintered beads can contain multiple layers of abrasives. Some wire saws can use a resin to bind the abrasives to the wire. Unfortunately, the resin bonded wire saws tend to wear quickly and the abrasives are lost well before the useful life of the particles is realized.

A number of attempts have been made to overcome the above-recited shortcoming. Most notably, several techniques that attempt to chemically bond the superabrasive particles to the matrix, or other substrate material, have been employed. The main focus of such techniques is to coat or otherwise contact the superabrasive particle with a reactive element that is capable of forming a carbide bond between the superabrasive particle and the metal matrix, such as titanium, chromium, tungsten, etc. Examples of specific processes include those disclosed in U.S. Pat. Nos. 3,650, 714 4,943,488; 5,024,680; 5,030,276; and 6,102,024, each of which is incorporated herein by reference. However, such processes are difficult and costly for a variety of reasons, including the highly inert nature of most superabrasive particles, and the high melting point of most reactive materials. Additionally, the direct brazing of superabrasive particles to the metal wire reduces the flexibility of the wire saw and the braze coating becomes susceptible to fatigue and premature failure.

Further, the melting point of most reactive metal materials is well above the stability threshold temperature of most superabrasives. To this end, the method by which the reactive material may be applied to the superabrasives is generally limited to either solid-state reactions or gas reactions that are carried out at a temperature that is sufficiently low so that damage to the diamond does not occur. Such processes are only capable of achieving a monolithic coating, and cannot produce an alloy coating. While the strength of the carbide bonds yielded using these techniques generally improves particle retention over mere mechanical bonds, they still allow superabrasive particles to become dislodged prematurely.

Another method of forming carbide bonds is by using a braze alloy that contains a reactive element. The braze alloy is consolidated around the superabrasive particles by sintering. One example of a specific process of this type is found in U.S. Pat. No. 6,238,280, which is incorporated herein by reference. While such processes may yield a tool that has greater grit retention than tools having no chemical bonding of the superabrasive particles, as a general matter, solid-state sintering of the braze alloy only consolidates the matrix material, and does not attain as much chemical bonding as the solid and gas state deposition techniques.

As such, superabrasive wire saws that display improved superabrasive particle retention and wear characteristics, including methods for the production thereof, continue to be sought through ongoing research and development efforts.

SUMMARY OF THE INVENTION

Accordingly, the present invention provides superabrasive wire saws having improved superabrasive particle retention, and methods for the making thereof. As a basic component of such tools, the present invention additionally provides a coated superabrasive particle having improved retention properties when incorporated into a wire saw using an organic binder. In one aspect, the coated superabrasive particle may include a superabrasive particle, and a solidified coating of a molten braze alloy that is chemically bonded to the superabrasive particle.

In accordance with the present invention, a superabrasive wire saw includes a wire and a superabrasive layer. The superabrasive layer can have a plurality of individual coated superabrasive particles attached to the wire with an organic binder. The coated superabrasive particles used in the present invention include a superabrasive particle and a solidified coating of a molten braze alloy chemically bonded to the superabrasive particle. In one detailed aspect of the present invention, the superabrasive layer can be substantially continuous or can be discontinuous having a plurality of abrasive segments.

Another aspect of the present invention includes a method of forming a superabrasive wire saw. Superabrasive particles can be coated with a braze alloy in a molten liquid state and then solidified around the superabrasive particle. The braze alloy can contain a reactive element such that the braze alloy becomes chemically bonded with the superabrasive particle to form the coated superabrasive particles. A mixture of coated superabrasive particles and organic binder is then formed over at least a portion of a wire. The organic binder can be cured to secure the coated superabrasive particles to the wire to form a superabrasive wire saw.

In one detailed aspect of the present invention, the coated superabrasive particles can have an average surface roughness of from about 0.5 µm to about 8 µm, and preferably from about 4 µm to about 8 µm, which aids in improving retention of particles in the organic binder.

In one aspect of the invention, a coated superabrasive particle may be made by the steps of: covering the superabrasive particle with the braze alloy in a molten liquid state, and solidifying the liquid braze alloy around the superabrasive particle. Due to the liquid state of the alloy, it is able to wet the superabrasive particle and spread over the surface thereof. As a result, and due to the presence of a carbide-forming element in the alloy, chemical bonds are formed at the interface of the metal and the superabrasive particle, which provide a bonding strength of about 5 to 10 times greater than that achieved with either electroplating or sintering. Hence, when used in a superabrasive tool, the superabrasive grit can protrude further out of the support material and achieve a higher rate of material removal. Furthermore, tool life is lengthened because the rate at which superabrasive grits are pulled out of or dislodged from the support material is significantly slowed.

There has thus been outlined, rather broadly, various features of the invention so that the detailed description thereof that follows may be better understood, and so that the present contribution to the art may be better appreciated. Other features of the present invention will become clearer from the following detailed description of the invention, taken with the accompanying claims, or may be learned by the practice of the invention.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an" and "the" include plural referents unless the context clearly dictates otherwise. Thus, for example, reference to "a diamond particle" includes one or more of such particles, reference to "an abrasive segment" includes reference to one or more of such abrasive segments, and reference to "a reactive material" includes reference to one or more of such materials.

Definitions

In describing and claiming the present invention, the following terminology will be used in accordance with the definitions set forth below.

As used herein, "super hard" and "superabrasive" may be used interchangeably, and refer to a crystalline, or polycrystalline material, or mixture of such materials having a Vicker's hardness of about 4000 kg/mm$^2$ or greater. Such materials may include without limitation, diamond, and cubic boron nitride (cBN), as well as other materials known to those skilled in the art. While superabrasive materials are very inert and thus difficult to form chemical bonds with, it is known that certain reactive elements, such as chromium and titanium are capable of chemically reacting with superabrasive materials at certain temperatures.

As used herein, "metallic" refers to a metal, or an alloy of two or more metals. A wide variety of metallic materials are known to those skilled in the art, such as aluminum, copper, chromium, iron, steel, stainless steel, titanium, tungsten, zinc, zirconium, molybdenum, etc., including alloys and compounds thereof.

As used herein, "particle" and "grit" may be used interchangeably, and when used in connection with a superabrasive material, refer to a particulate form of such material. Such particles or grits may take a variety of shapes, including round, oblong, square, euhedral, etc., as well as a number of specific mesh sizes. As is known in the art, "mesh" refers to the number of holes per unit area as in the case of U.S. meshes.

As used herein, "reactive element" and "reactive metal" may be used interchangeably, and refer to a metal element that can chemically react with and chemically bond to a superabrasive particle. Examples of reactive elements may include without limitation, transition metals such as titanium (Ti) and chromium (Cr), including refractory elements, such as zirconium (Zr) and tungsten (W), as well as non-transition metals and other materials, such as aluminum (Al). Further, certain elements such as silicon (Si) which are technically non-metals may be included as a reactive element in a brazing alloy.

As used herein, "wetting" refers to the process of flowing a molten metal across at least a portion of the surface of a superabrasive particle. Wetting is often due, at least in part, to the surface tension of the molten metal, and can lead to the forming of chemical bonds between the superabrasive particle and the molten metal at the interface thereof, when a braze alloy is used. Accordingly, a tool having superabrasive particles that are "wet" by a metal may indicate the existence of chemical bonds between the superabrasive particles and the metal at the interface thereof.

As used herein, "chemical bond" and "chemical bonding" may be used interchangeably, and refer to a molecular bond that exert an attractive force between atoms that is sufficiently strong to create a binary solid compound at an interface between the atoms. Chemical bonds involved in the present invention are typically carbides in the case of diamond superabrasive particles, or nitrides or borides in the case of cubic boron nitride.

As used herein, "braze alloy" and "brazing alloy" may be used interchangeably, and refer to an alloy containing a sufficient amount of a reactive element to allow the formation of chemical bonds between the alloy and a superabrasive particle. The alloy may be either a solid or liquid solution of a metal carrier solvent having a reactive element solute therein. Moreover, the term "brazed" may be used to refer to the formation of chemical bonds between a superabrasive particle and a braze alloy.

As used herein, "coat," "coating," and "coated," with respect to a reactive metal alloy, or a braze alloy, refer to a layer of such an alloy that is chemically bonded to a superabrasive particle along at least a portion of an outer surface of the superabrasive particle. In some aspects, the layer may substantially encase or enclose the entire superabrasive particle, while being chemically bonded thereto. It is to be understood that such layers are limited in some instances to a certain thickness. It is possible that a number of coated particles be consolidated together and a support matrix for the diamond particles formed from the coating of the particles.

As used herein, "separator" refers to any form of a material that is capable of separating superabrasive particles during the process of coating such superabrasive particles with a molten braze alloy. In one aspect, the separator may be thermally resistant powder that has no affinity to chemically react with the molten braze alloy. In another aspect, the separator may be a sheet, tray, or other forms with a plurality of apertures for separating individual particles.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited.

As an illustration, a numerical range of "about 1 $\mu$m to about 5 $\mu$m" should be interpreted to include not only the explicitly recited values of about 1 $\mu$m to about 5 $\mu$m, but also include individual values and sub-ranges within the indicated range. Thus, included in this numerical range are individual values such as 2, 3, and 4 and sub-ranges such as from 1–3, from 2–4, and from 3–5, etc. This same principle applies to ranges reciting only one numerical value. Furthermore, such an interpretation should apply regardless of the breadth of the range or the characteristics being described.

Invention

The present invention encompasses superabrasive wire saws having improved superabrasive particle retention, as well as various components thereof, such as a coated superabrasive grit. Additionally, the present invention encompasses various methods for the fabrication of such tools and components. While the invention of this application is primarily focused on wire saws, other tools utilizing the basic braze coating technology of the present invention is contained in Applicant's copending U.S. patent application entitled "Molten Braze Coated Superabrasive Particles and Associated Methods", filed under attorney docket no. 20303.CIP, on Jul. 25, 2003, which is incorporated herein by reference.

Figure 1:
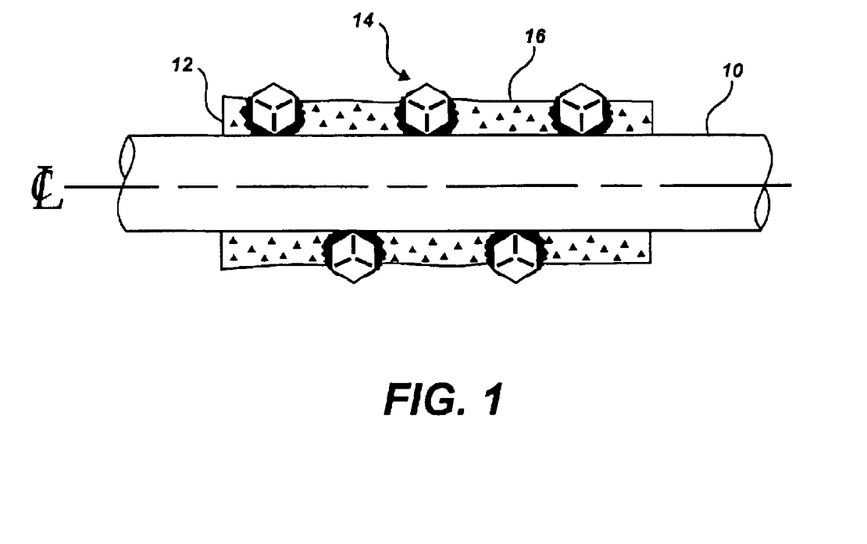
FIG. 1 shows a cross-section view of a wire saw produced in accordance with an embodiment of the present invention.

Referring now to FIG. 1, the present invention provides a wire 10 and a superabrasive layer 12 having a plurality of individual coated superabrasive particles 14 attached to the wire with an organic binder 16. The coated superabrasive particles 14 of the present invention can include a superabrasive particle, and a solidified coating of a molten braze alloy which is chemically bonded to the superabrasive particle, as discussed in more detail below.

The wire 10 can be formed of any material which is capable of withstanding the conditions of wire saw usage such as flexing and tension. Wires suitable for use in the present invention can typically be metal wires such as steel including high carbon steel, tungsten, copper, and the like. Other materials, whether currently known or yet to be developed could also be used such as polymers, carbon nanotubes, composites, and any other such material. In one aspect, the wire can be pretreated with a metal such as copper or brass to improve adhesion of coated superabrasive particles and organic binder as discussed in more detail below. Further, the wire can be provided as a single strand or as a twisted bundle of smaller strands. The principles of the present invention can be applied using wires of almost any size and is largely governed by the intended application. As kerf loss is often an important factor, smaller wire gauge sizes are frequently preferred to avoid unnecessary waste of a workpiece. Although other wire sizes can be used, wires having a diameter of from about 0.1 mm to about 10 mm are of particular interest. Such small diameters allow for cutting of silicon ingots without significant kerf loss having a straight and smooth cut which reduces further processing. Wire saws useful in cutting such materials, can have a diameter of from about 0.1 mm to about 0.2 mm. In addition, the wires of the present invention can have circular or other cross-sectional profiles as known by those skilled in the art.

The superabrasive particles of the present invention can be coated with a braze alloy to produce individual coated superabrasive particles. As used herein, "individual coated" is intended to refer to particles which are coated such that most of the particles are independent and not agglomerated to other coated particles. Although a small number of such coated particles may be agglomerated in small number of less than about five particles, substantially all of the coated particles will be separate from one another.

The superabrasive particles used may be selected from a variety of specific types of diamond (e.g., polycrystalline diamond) and cubic boron nitride (e.g., polycrystalline cBN), and are capable of chemically bonding with a reactive material. Further, such particles may take a number of different shapes as required to accommodate specific cutting properties for the wire saw into which it is incorporated. However, in one aspect, the superabrasive particle may be diamond, including natural diamond, synthetic diamond, and polycrystalline diamond (PCD). In yet another aspect, the superabrasive particle may be cubic boron nitride (cBN), either single crystals or polycrystalline. Although superabrasive particles suitable for use in the present invention can have almost any mesh size, typical mesh sizes range from about 500 to about 35, depending on the wire diameter. Typical coated superabrasive particles can have a diameter which is from about $\frac{1}{6}^{th}$ to $\frac{1}{2}$ the diameter of the wire, and preferably about $\frac{1}{5}^{th}$ to about $\frac{1}{3}^{rd}$.

Additionally, a number of reactive elements may be used in the metal alloy in order to achieve the desired chemical bonding with the superabrasive. A wide variety of reactive elements that can be alloyed with a metallic carrier is known to those skilled in the art, and the selection of a particular reactive element may depend on various factors. Examples of suitable reactive elements for inclusion in the brazealloy used in the present invention include without limitation, members selected from the group consisting of: aluminum (Al), boron (B), chromium (Cr), lithium (Li), magnesium (Mg), molybdenum (Mo), manganese (Mn), nirobium (Nb), silicon (Si), tantalum (Ta), titanium (Ti), vanadium (V), tungsten (W), zirconium (Zr), and mixtures thereof. In one aspect of the present invention, the reactive element can be Cr or Ti. In addition to the reactive element or elements, the braze alloy used to form the coating in accordance with the present invention includes at least one other metal as a carrier or solvent. Any metal recognized by one of ordinary skill in the art may be used as such a carrier or solvent, especially those known for use in making superabrasive tools. However, by way of example, without limitation, in one aspect of the present invention, such metals may include Co, Cu, Fe, Ni, and alloys thereof. One currently preferred braze alloy composition includes Cr—Ni—B—Si (commercially available as NICROBRAZ LM from Wall Colmonoy Corp).

As alluded to above, one goal of alloying a reactive element with another metal is to reduce the effective melting point of the reactive element, while maintaining its ability to chemically bond with a superabrasive particle. As is known in the art, the thermal stability limit of many superabrasive materials, such as diamond, ranges from about 900° C. to about 1200° C. As such, in one aspect of the invention, the components and exact ratios of the reactive metal alloy may be selected to provide an alloy that has a melting point within or below the thermal stability limit of the particular superabrasive material being used. In practice, a solvent metal may be selected and combined with a reactive element in proper amounts to reduce the melting temperature of both elements and yield a braze alloy having a melting temperature of less than about 1200° C. In yet another aspect, the melting temperature may be below about 900° C.

As will be recognized by those of ordinary skill in the art, numerous combinations of specific reactive metals and other specific carrier metals may be alloyed in different ratios or amounts to achieve an alloy that chemically bonds to the superabrasive particle, and has a suitable melting point. However, in one aspect, the content of the reactive element may be at least about 1% of the alloy. In another aspect, the amount of reactive element may be at least about 5% of the alloy.

Notably, the improved retention aspects of the coated abrasive particles of the present invention are due in large measure to the amount of chemical bonding that is achieved between the coating and the superabrasive particle. The absence or nominal presence of such chemical bonding is a primary cause of premature grit pullout in tools employing known methods, such as electroplating and sintering.

One advantage presented by the method of the present invention is the ability to vary or control the thickness of the reactive metal alloy coating around the superabrasive particle. Such an ability is enabled by the molten liquid state in which the alloy is applied, as will be discussed in further detail below. Specific thicknesses may be selected by one of ordinary skill in the art, as required to accomplish a particular purpose. However, in one aspect of the invention, the coating may have a thickness of at least about 1 micrometer. In another aspect, the coating may have a thickness of at least about 50 micrometers.

The particle coating may be accomplished in a single layer, or by the production of multiple layers. In one aspect of the invention, the coating may further include at least one metallic overcoat layer that is bonded to an outside portion of the solidified braze alloy coating. A number of materials may be used for such a metallic overcoat, as will be recognized by those of ordinary skill in the art, and specific selection may be based on a number of factors, including organic binder material and design of the wire saw into which the coated particle is to be incorporated. However, in one aspect, the metallic overcoat may include at least one metal selected from the group consisting of Co, Cu, Fe, Ni, and mixtures thereof. As will be recognized, one or more overcoats may be utilized to achieve a desired total coating thickness for the coated particle. In one aspect, the total coating thickness achieved around the superabrasive particle may be greater than the diameter of the superabrasive particle.

In addition to the metallic overcoat, a number of various other materials may be applied as an overcoat on the solidified braze alloy coating. In some aspects, such materials may be particulate materials of various constitution, with the proviso that such particulates each have a size that is smaller than the coated superabrasive particle. Examples of specific types include without limitation, metallic particulates, metallic alloy particulates, such as carbides, or superabrasive particulates. Examples of specific carbide particulates include without limitation, SiC, WC, and Ti coated cBN. Such coatings have been found to further increase the retention strength of the superabrasive particle. Specifically, coatings of these types effect a gradual or "gradient" transition between the outside of the reactive metal alloy coating, and the matrix material of the tool into which the coated superabrasive particle is incorporated. Thus, the weak interface created by a sharper transition between two materials is eliminated.

Figure 4:
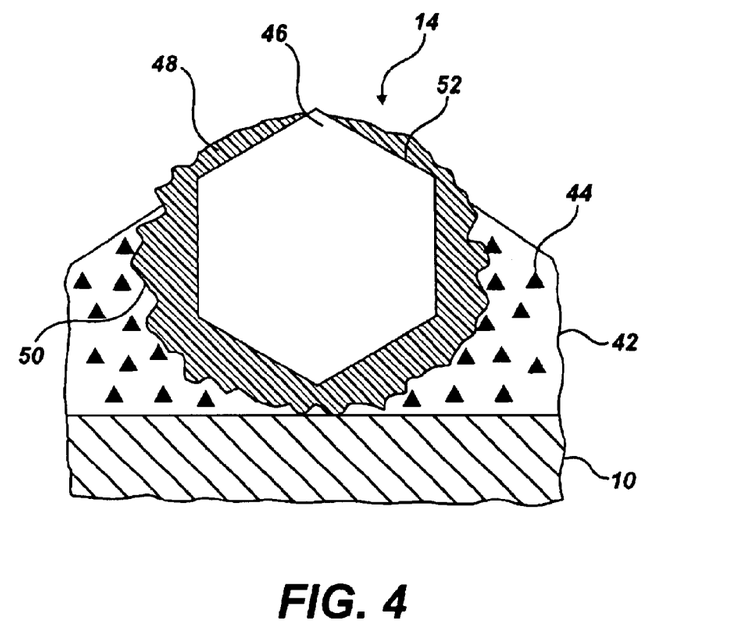
FIG. 4 is a cross-section view of a portion of a wire saw in accordance with an embodiment of the present invention.

In one aspect of the present invention, the molten braze alloy may wet at least about 40% of the surface of the superabrasive particle. In another aspect, the alloy may wet at least about 50% of the surface of the superabrasive particle. In yet another aspect, the alloy may wet at least about 60% of the surface of the superabrasive particle. In some aspects, at least about 80% or greater of the surface of the superabrasive particle may be wetted by the braze alloy. In many applications, it is desirable that at least a portion of the diamond be exposed as shown in FIGS. 1 and 4.

In one aspect, the coated superabrasive particles of the present invention are produced using a method of chemically bonding a superabrasive particle to a reactive metal alloy coating. Such a method may include the steps of: covering the superabrasive particle with the braze alloy in a molten liquid state, and solidifying the liquid braze alloy around the superabrasive particle, such that the reactive metal alloy becomes chemically bonded with the superabrasive particle.

Those of ordinary skill in the art will recognize a number of ways to cover the superabrasive particle with the molten braze alloy, such as by dipping the particles in the alloy, and dripping the alloy onto the particles, among other application techniques. However, in one aspect of the invention, the step of covering may further include the steps of: coating the superabrasive particle with an organic binder material, adhering a powdered form of braze alloy to the superabrasive particle with the organic binder material, and heating the reactive metal alloy to a temperature sufficient to cause the alloy to melt and coat and chemically bond to the superabrasive particle.

A variety of binders will be recognized as suitable for use in this context by those of ordinary skill in the art. However, in one aspect, the binder material may be a member selected from the group consisting of: polyvinyl alcohol (PVA), polyvinylbutyral(PVB), polyethyleneglycol(PEG), paraffin, phenolic resin, wax emulsions, and acrylic resin. In another aspect, the binder may be PEG. Further, applying the powdered form of the reactive metal alloy to the binder coated particle for the purposes of adhering the alloy thereto may be accomplished by various methods, such as rolling, dipping, or tumbling the binder coated particles with the powder. Further, such application may be accomplished by various methods of spraying, showering, projecting, or otherwise directing the powder onto the superabrasive particles to form the desired coating. On example of such a method is by the use of a fluidized bed stream. Other methods of adhering the powder to the binder coated particles will be recognized by those of ordinary skill in the art.

A variety of ways for heating the powder coated superabrasive particles may be employed as recognized by those of ordinary skill in the art. No particular limitation is placed on the specific heating mechanism employed, other than the ability to reach a temperature sufficient to melt the powdered braze alloy into a molten liquid state. Once melted, the liquid alloy will wet the superabrasive particles and form the desired chemical bonds at the interface thereof. Further, other mechanisms in addition to heat may be used to facilitate the melting and liquefaction of the alloy, such as by adding a flux, or other methods as will be recognized by those of ordinary skill in the art, so long as such methods do not hinder or prevent the wetting of the superabrasive particles and the formation of the desired chemical bonds.

Under some circumstances, it may be desirable to first coat or "pre-treat" the superabrasive particle with certain materials, prior to covering it with the molten braze alloy. For example, when the superabrasive particle being used is cBN, or another superabrasive material that is extremely inert, the high inertness of such materials may make it quite difficult to create chemical bonds with the molten braze alloy. Therefore, in one aspect of the present invention, the superabrasive particle may be conditioned by forming a pre-treatment layer of a reactive material on the superabrasive particle. Such layers may typically be formed by conventional methods, such as the solid state and vapor deposition techniques discussed above. In one aspect, the pre-treatment layer may be a reactive material selected from the group consisting of: Cr, Si, Ti, and W. In another aspect, the pre-treatment material may be Ti. Those of ordinary skill in the art will recognize other suitable materials that may be first deposited on the superabrasive particle, including materials formed in multiple layers, in order to facilitate or enhance the formation of chemical bonding with the molten braze alloy.

As a practical matter, it may often be the case that a plurality of superabrasive particles are simultaneously coated with the molten braze alloy in a single processing event. In such instances, according to certain aspects of the present invention, it may be desirable to prevent coated particles from fusing or joining together. As such, in one aspect, the heating step of the present method may include the steps of: distributing the superabrasive particles in a separator that allows separation of the particles during heating, heating the reactive metal alloy to a temperature sufficient to cause the alloy to melt and wet and chemically bond to the superabrasive particle, and removing the individual coated superabrasive particles from the separator. A variety of separating methods and devices may be employed. The specific selection of a particular separator may be dictated by factors such as speed, economy, and quality of result achieved. However, in one aspect, the separator may be a powder which does not react with the braze alloy, and which can tolerate high temperatures. Examples of such materials include without limitation, oxide powders, such as $Al_2O_3$, $SiO_2$, or $ZrO_2$, and nitride powders, such as BN, AlN. Other nonreactive powdered materials will be recognized by those of ordinary skill in the art.

In another aspect, the separator may be a plate with a plurality of apertures therein. The specific size and placement of the apertures may be determined in part by the size and shape of the superabrasive grit being coated. However, as a general procedure, a single superabrasive grit may be placed in each aperture of the plate, in either a coated or uncoated state. Excess grits are swept off the plate, and the apertures are then filled with braze powder. The plate containing the grits and braze alloy is then subjected to a sufficient amount of heat to melt the braze alloy and cause the wetting of the grits and the formation of chemical bonds. In the case where grits have not been pre-coated prior to deposition in the apertures, powdered coating may then be placed in, or over, the aperture, and will cover and attach to the superabrasive particle when melted by a sufficient amount of heat.

After the melted braze alloy has bonded to the superabrasive particles, the particles are allowed to cool, and the braze alloy solidifies. Once the alloy has solidified, the individual coated superabrasive particles are removed from the separator and may be either subjected to additional processing steps as alluded to above, such as by applying one or more overcoats, or by bonding additional smaller particles thereto. Alternatively, the coated superabrasive particles may be directly incorporated into a wire saw by coupling the particles to a wire as described below.

Once the coated superabrasive particles are complete, they can be incorporated into a superabrasive wire saw. In accordance with the present invention, a mixture of coated superabrasive particles and organic binder can be formed over at least a portion of the wire. Suitable organic binders include, without limitation, epoxy resin, phenolic resin, acrylic resin, polyurethane resin, polyester resin, polyimide resin, melamine resin, urea resin, allyl resin, alkyd resin, formalin resin, cyanate ester resin, polyamide resin, and mixtures thereof. Other organic binders can be used which have a modulus of elasticity which is sufficient for use in wire saws and can be selected by those of ordinary skill in the art. The organic binder and coated superabrasive particles can be mixed prior to applying to the wire or applied sequentially. Additionally, a filler material can be included in the organic binder as known by those skilled in the art. Suitable filler materials can include WC, SiC, $Al_2O_3$, $SiO_2$, $CrO_2$, $TiO_2$, $ZnO_2$, BN, mica, kaolin, clay, ceramics, metal powders, and any other filler materials known to those skilled in the art. Depending on the organic binder, a filler material may be desirable in order to increase the wear resistance and thickness of the layer. Typically, amounts of from about 1% by volume to about 50% by volume can be used. Higher filler content can be used; however, care must be taken to choose filler compositions and volumes which do not reduce flexibility beyond useful limits. The organic binder layer 12 (FIG. 1) can be almost any thickness; however, thicknesses of from about 0.1 to about 0.5 times the diameter of the wire 10 are preferred.

In an additional alternative embodiment, an organometallic coupling agent can be included in the organic binder to improve the bonding of the coated superabrasive particles to the organic binder. A wide variety of organometallic coupling agents is known to those skilled in the art. Organometallic coupling agents can include at least one reactive moiety which chemically reacts with metal to form a chemical bond and at least one reactive moiety which reacts with the organic binder to form a chemical bond. In this way, the organometallic coupling agent acts as a bridge to form bonds between the organic binder and the metal surface of the coated superabrasive particles. In one aspect of the present invention, the organometallic coupling agent can be a titanate, zirconate, silane, or mixture thereof. These materials can contain hydrolyzable groups which react with hydroxyl groups on the uncovered areas of the metallic particles, and thereby chemically bond to the metal surface. Additionally, these materials can also contain non-hydrolyzable groups which chemically react with the organic binder. Such organometallic coupling agents are described in U.S. Pat. Nos. 4,620,933; 5,558,705; 5,571,296, and 6,579,931, which are each incorporated by reference.

Specific non-limiting examples of silanes suitable for use in the present invention include: 3-glycidoxypropyltrimethoxy silane (available from Dow Corning as Z-6040); γ-methacryloxy propyltrimethoxy silane (available from Union Carbide Chemicals Company as A-174); β-(3,4-epoxycyclohexyl)ethyltrimethoxy silane, γ-aminopropyltriethoxy silane, N-(β-aminoethyl)-γ-aminopropylmethyldimethoxy silane (available from Union Carbide, Shin-etsu Kagaku Kogyo K.K., etc.); and additional examples of suitable silane coupling agents can be found in U.S. Pat. Nos. 4,795,678; 4,390,647; and 5,038,555, which are each incorporated herein by reference.

Specific non-limiting examples of titanate coupling agents include: isopropyltriisostearoyl titanate, di(cumylphenylate)oxyacetate titanate, 4-aminobenzenesulfonyldodecylbenzenesulfonyl titanate, tetraoctylbis(ditridecylphosphite) titanate, isopropyltri(N-ethylamino-ethylamino) titanate (available from Kenrich Petrochemicals. Inc.), neoalkyoxy titanates such as LICA-01, LICA-09, LICA-28, LICA-44 and LICA-97 (also available from Kenrich), and the like.

Specific non-limiting examples of aluminum coupling agents include acetoalkoxy aluminum diisopropylate (available from Ajinomoto K. K.), and the like.

Specific non-limiting examples of zirconate coupling agents include: neoalkoxy zirconates, LZ-01, LZ-09, LZ-12, LZ-38, LZ-44, LZ-97 (all available from Kenrich Petrochemicals, Inc.), and the like. Other known organometallic coupling agents, e.g. thiolate based compounds, can be used in the present invention and are considered within the scope of the present invention.

The amount of organometallic coupling agent used depends on the coupling agent and on the surface area of the metallic particles coating the superabrasive particles. Typically, 0.05% to 10% by weight of the organic binder layer is sufficient. The organometallic coupling agent can also improve bonding between the organic binder layer and the metal wire, as well as bonding with the coated superabrasive particles.

Figure 2:
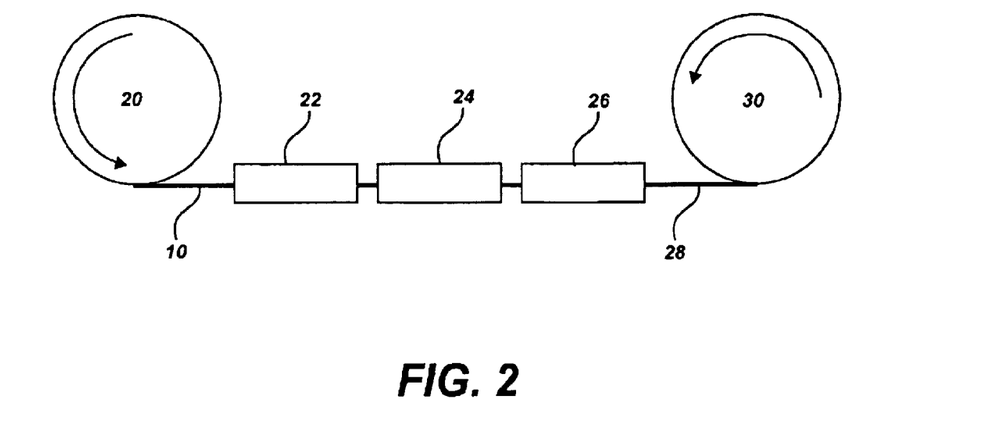
FIG. 2 is a schematic of a continuous process which can be used in producing the wire saws of the present invention.
Figure 3:
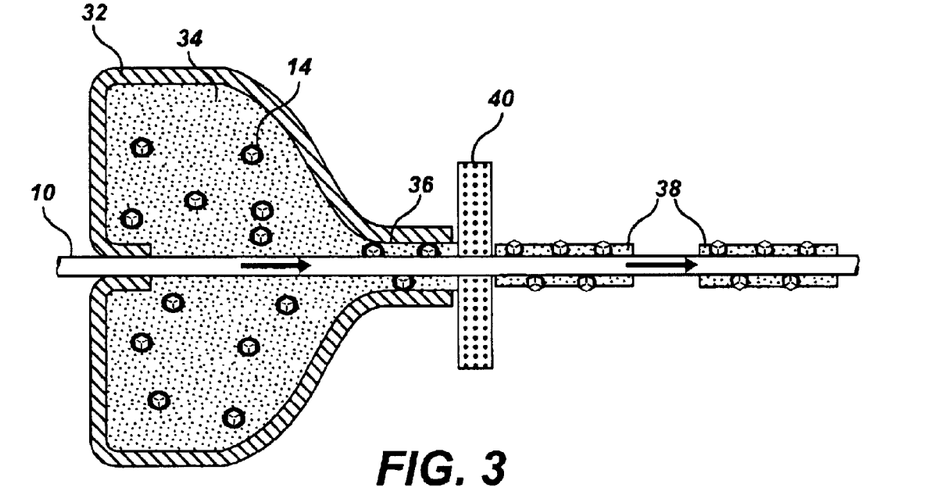
FIG. 3 is a cross-section view of one embodiment of the organic binder layer application process.

The superabrasive wire saw of the present invention can be produced either in a batch process or in a continuous manner. For example, as shown in FIG. 2, the wire 10 can be supplied from a spool 20 and translated through a number of processing areas such as coating area 22, drying area 24, and curing area 26. After curing, the superabrasive wire saw 28 can then be wound and stored on spool 30. In one embodiment of the present invention, the mixture of organic binder and coated superabrasive particles is formed and then applied over at least a portion of the wire at coating area 22. FIG. 3 illustrates one method of applying a mixture of coated superabrasive particles and organic binder to the wire. In the illustrated embodiment, the wire 10 is drawn through a bed 32 containing the mixture 34. As the wire exits the bed, the exit orifice 36 is sized to leave a desired thickness of mixture on the wire. Typical mixture thicknesses will depend on the wire diameter and the final product dimensions. However, thicknesses which are from about 0.4 to about 0.9 times the diameter of the coated superabrasive particles provide adequate results. Although not required, the superabrasive layer can be formed having the superabrasive particles in a single layer.

Regardless of the method of applying the organic binder and coated superabrasive particles, the mixture can be applied such that the superabrasive layer is substantially continuous. Likewise, in some cases it is desirable to form the superabrasive layer in a discontinuous manner having a plurality of abrasive segments 38. Including areas without superabrasive particles allows for improved swarf removal and reduces the friction forces against the wire saw as it moves across a cutting surface. As shown in FIG. 3, an optional apparatus 40 can be included to either prevent the mixture from being deposited over a specific length of wire or to remove portions of mixture already applied. The apparatus can be a sponge, block, spray of solvent, or any other apparatus which would leave a discontinuous superabrasive layer. The dimensions of the discontinuous abrasive segments 38 will be governed by design factors recognized by those skilled in the art.

In an alternative embodiment, the organic binder can be applied to the wire using any number of methods such as brushing spraying, doctoring, or dipping the wire in the organic binder and optional filler materials. The coated superabrasive particles can then be applied to the organic binder by sprinkling, directed placement, or any other method. In such embodiments the coated superabrasive particles can be arranged in accordance with a predetermined pattern or specific configuration. Examples of specific methods of effecting such patterns or configurations of superabrasive particles may be found in U.S. Pat. Nos. 4,925,457; 5,380,390; 6,039,641; and 6,286,498, each of which is incorporated herein by reference. Accordingly, the pattern and concentration of coated superabrasive particles can be homogenous or vary over the length of the wire saw. Variations in concentration may be desirable in order to provide variable cutting rates at a constant cutting speed, improved swarf removal, and the like. It will be understood that the principles described above in connection with applying a premixed mixture to the wire also apply to applying the organic binder, coated superabrasive particles, and/or other filler materials sequentially. Further, the order of applying materials can be reversed. For example, the coated superabrasive particles can be glued directly to the wire using any known adhesive material. The organic binder can then be applied over the coated superabrasive particles. In this way, the coated superabrasive particles are closer to the wire surface allowing for narrower wire saw diameters and increased retention of the particles by the organic binder.

In another alternative embodiment, the wire can be covered with an adhesive. The coated superabrasive particles can then be adhered to the adhesive by sprinkling, dipping or otherwise contacting the particles with the adhesive. The organic binder, containing optional filler material and/or organometallic coupling agent, can then be applied over the top of the adhered coated superabrasive particles.

Following formation of the superabrasive layer 12 (shown in FIG. 1),the organic binder can be cured. It is to be understood that curing can involve merely drying the binder composition through solvent removal and/or involve chemical reactions which polymerize the organic binder such as with epoxy and phenolic resins; both types of "curing" are intended to be within the scope of the present invention. The organic binder is cured to secure the coated superabrasive particles to the wire to form a superabrasive wire saw. Typical curing temperatures are from about 40° C. to about 400° C. for up to about 60 minutes.

Turning now to FIG. 4, a coated superabrasive particle 14 is shown in a cured organic binder 42 attached to a wire 10. The binder 42 shown also contains an optional filler material 44. The coated superabrasive particles 14 of the present invention can be a superabrasive particle 46 coated with solidified coating 48 of molten braze alloy. As discussed earlier, the solidified coating 48 is preferably chemically bonded to the superabrasive particle 46. Of particular note is the outer surface 50 of the coated superabrasive particle. The outer surface can have a surface roughness of from about 3 μm to about 10 μm. A higher surface roughness can increase the strength of mechanical bonding with the organic binder and additionally provide increased surface area for chemical bonding. In contrast, the surface 52 of the superabrasive particle 46 typically has an ultrasmooth surface having a surface roughness of less than about 50 nm. The higher surface roughness of the outer surface 50 improves the bonding of the coated superabrasive particle in the organic binder over superabrasive wire saws using uncoated abrasives in an organic binder. Thus, the useful tool life is extended while also providing a flexible wire saw.

The final superabrasive wire saws of the present invention can be used in a variety of cutting processes known in the art. These processes can include single or multi-wire cutting machines known to those skilled in the art. The wire saws of the present invention can further be used to cut materials such as silicon ingots with high precision and low kerf loss, as well as concrete, marble, granite and the like.

The present invention additionally encompasses various methods of making and using superabrasive wire saws, including various components thereof as described herein. Such methods may employ the materials, structures, dimensions, and other parameters disclosed for the device above, as well as equivalents thereof as recognized by one of ordinary skill in the art.

The following examples present various methods for making the superabrasive wire saws of the present invention. Such examples are illustrative only, and no limitation on present invention is meant thereby.

EXAMPLES

Example 1

Diamond grits of 40/50 mesh were covered with a thin film of an acrylic binder. The binder covered diamond was then mixed with a powdered metallic alloy containing B, Ni, Cr, Si, having an average particle size of about 325 mesh, and sold under the trade name NICROBRAZ LM® (Wall Colmonoy). The result is a braze powder wrapped diamond. These coated grits were then mixed with fine powder of $Al_2O_3$. The mixture was heated in a vacuum furnace held at $10^{-5}$ torr to a maximum temperature of about 1005° C. for approximately 17 minutes to assure that the metallic alloy coating became molten and liquefied and flowed around the diamond particles wetting them. The mixture was then cooled and retrieved from the furnace. After separating the diamond particles from $Al_2O_3$, a number of coated particles were mixed with a cobalt powder and sintered in a hot press to form rectangular segments. Some of these segments were broken by bending with pliers. The fractured surface was then viewed under a microscope. It was observed that the fracture plane propagated through the coated diamond particles rather than deviating around the interface between the diamond particle and the coating, as is typical of sintered diamond particles without the braze coating described above.

Example 2

The same procedure as outlined in Example 1 was followed, but the $Al_2O_3$ separator powder was replaced with diamond particles having an average mesh size of from about 325 to about 400 mesh. During the heating process, the smaller diamond particles wetted by the braze alloy coating, and became chemically bonded to the outside of the coated diamond particle. Thus, coated diamond particles having a chemically bonded metallic alloy shell with smaller diamond particles further bonded to the outside of the shell were produced. These "spiky" coated particles were incorporated into a cobalt matrix and fracture tested as above with similar results achieved.

Example 3

The process of Example 2 was followed, but the smaller diamond particles were replaced with particles of SiC. The process yielded a coated diamond particle having ceramic particles bonded to the outside of the metallic coating similar to the diamond particles of Example 2. Moreover, the fracture testing yielded results similar to that of Examples 1 and 2.

Example 4

Diamond particles were coated with a powdered braze alloy as in Example 1, and then lined up in a groove carved on an $Al_2O_3$ plate. A small amount of braze powder was packed in between the coated particles, and the assembly was heated in a furnace as in Example 1. The resultant "needle" was fracture tested as in the previous examples, and revealed fracture across a diamond grit, rather than fracture around the diamond grit at the interface of the diamond and the metal alloy coating, or between diamond particles.

Example 5

The same procedure was followed as in Example 4; however, diamond coated particles were spread out on the $Al_2O_3$ plate. Braze powder was then packed between the coated particles and the assembly was heated as in the previous examples. The resultant diamond plate of diamond grit bonded by brazing alloy was then fracture tested as in previous examples. Analysis of the fracture plains revealed random fractures that included fractures through various diamond particles, rather than a pattern of fractures following the diamond particle arrangement and falling primarily at the diamond particle/metallic coating interfaces.

Example 6

The procedure of Examples 4 and 5 was again followed, only the interstices between coated diamond particles were filled with a mixture of WC and the braze powder used to coat the diamond particles. Heating in accordance with the prior examples was again conducted, and a tile of the composite materials was obtained. The tile was fracture tested, and the results proved to be consistent with those obtained for the above-recited examples.

Example 7

The coated superabrasive particles of Example 1 are mixed with an epoxy resin at about 40% by volume of the binder. The binder includes about 35% by volume of tungsten carbide particles. A 0.5 mm copper-coated steel wire is drawn through the above mixture. The mixture is dried and then cured at about 300° C. for 30 minutes to produce a wire saw which is flexible and has increased cutting life

Example 8

An adhesive is sprayed onto a 0.3 mm steel wire and the coated superabrasive particles of Example 1 are sprinkled onto the wire. A mixture of 60% by volume phenolic resin, 35% by volume silicon carbide, and about 5% by volume γ-methacryloxy propyltrimethoxy silane is mixed to form the organic binder layer. The mixture is then applied to the steel wire having the coated superabrasives thereon. The mixture is then cured at about 300° C. for 45 minutes to produce a wire saw which is flexible and has increased cutting life.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A superabrasive wire saw, comprising a wire and a superabrasive layer having a plurality of individual coated superabrasive particles attached to the wire with an organic binder, said coated superabrasive particles comprising a superabrasive particle and a solidified coating of a molten braze alloy chemically bonded to the superabrasive particle.

2. The superabrasive wire saw of claim 1, wherein the superabrasive layer is substantially continuous.

3. The superabrasive wire saw of claim 1, wherein the superabrasive layer is discontinuous having a plurality of abrasive segments.

4. The superabrasive wire saw of claim 1, wherein the superabrasive particle is diamond.

5. The superabrasive wire saw of claim 1, wherein the superabrasive particle is cBN.

6. The superabrasive wire saw of claim 1, wherein the solidified coating is from about 1 $\mu$m to about 10 $\mu$m in thickness.

7. The superabrasive wire saw of claim 1, wherein the wire comprises a member selected from the group consisting of steel, tungsten, and copper.

8. The superabrasive wire saw of claim 1, wherein the wire has a diameter of from about 0.1 mm to about 10 mm.

9. The superabrasive wire saw of claim 8, wherein the wire has a diameter of from about 0.1 mm to about 0.2 mm.

10. The superabrasive wire saw of claim 8, wherein the coated superabrasive particle has a diameter about $\frac{1}{5}^{th}$ to about $\frac{1}{3}^{rd}$ the diameter of the wire.

11. The superabrasive wire saw of claim 1, wherein the braze alloy contains at least about 1% of a reactive element selected from the group consisting of Al, B, Cr, Li, Mg, Mo, Mn, Nb, Si, Ta, Ti, V, W, Zr, and mixtures thereof.

12. The superabrasive wire saw of claim 11, wherein the reactive element is Cr.

13. The superabrasive wire saw of claim 11, wherein the reactive element is Ti.

14. The superabrasive wire saw of claim 1, wherein the organic binder comprises a member selected from the group consisting of epoxy resin, phenolic resin, polyimide resin, and mixtures thereof.

15. The superabrasive wire saw of claim 1, wherein the organic binder further comprises an organometallic coupling agent.

16. The superabrasive wire saw of claim 1, wherein the organic binder further comprises a filler.

17. A method of forming a superabrasive wire saw, comprising the steps of:
   a) coating superabrasive particles with a braze alloy in a molten liquid state and solidifying the braze alloy around the superabrasive particle, such that the braze alloy becomes chemically bonded with the superabrasive particle to form coated superabrasive particles;
   b) forming a mixture of coated superabrasive particles and organic binder over at least a portion of a wire; and
   c) curing the organic binder to secure the coated superabrasive particles to the wire to form a superabrasive wire saw.

18. The method of claim 17, wherein the coated superabrasive particles have an average surface roughness of from about 3 $\mu$m to about 10 $\mu$m.

19. The method of claim 17, wherein the steps of coating the superabrasive particles, forming a mixture, and curing the organic binder are performed continuously as the wire is drawn through a processing area.

20. The method of claim 17, further comprising the step of removing portions of the mixture from the wire to form discontinuous segments.

21. The method of claim 17, wherein the coated superabrasive particles are in a single layer.

22. The method of claim 17, wherein the braze alloy contains at least about 1% of a reactive element selected from the group consisting of Al, B, Cr, Li, Mg, Mo, Mn, Nb, Si, Ta, Ti, V, W, Zr, and mixtures thereof.

23. The method of claim 22, wherein the reactive element is Cr or Ti.

24. The method of claim 17, wherein the step of coating further comprises the steps of:
   a) covering the superabrasive particle with a binder material;
   b) adhering a powdered form of braze alloy to the superabrasive particle with the binder material; and
   c) heating the braze alloy to a temperature sufficient to cause the alloy to melt and coat and chemically bond to the superabrasive particle.

25. The method of claim 24, wherein a plurality of superabrasive particles are coated simultaneously, and wherein prior to the step of heating, the method further comprises the steps of:
   a) distributing the superabrasive particles in a separator that allows separation of the particles during heating;
   b) heating the braze alloy to a temperature sufficient to cause the alloy to melt and coat and chemically bond to the superabrasive particle; and
   c) removing the individually coated superabrasive particles from the separator.

26. The method of claim 25, wherein the separator is a powder which is non-reactive with the reactive metal alloy.

27. The method of claim 26, wherein the non-reactive powder is either an oxide powder, or a nitride powder.

28. The method of claim 17, wherein the step of coating is preceded by the step of forming a layer of a material selected from the group consisting of Cr, Si, Ti, and W on the superabrasive particle.

29. The method of claim 17, wherein at least about 40% of the superabrasive particle surface is wetted by the molten braze alloy.

30. The method of claim 17, wherein the braze alloy has a melting temperature below a thermal stability limit of the superabrasive particle.

31. A method of forming a superabrasive wire saw, comprising the steps of:

a) coating superabrasive particles with a braze alloy in a molten liquid state and solidifying the braze alloy around the superabrasive particle, such that the braze alloy becomes chemically bonded with the superabrasive particle to form coated superabrasive particles having an average surface roughness of from about 3 μm to about 10 μm, said braze alloy has a melting temperature below a thermal stability limit of the superabrasive particle and contains at least about 1% of a reactive element selected from the group consisting of Al, B, Cr, Li, Mg, Mo, Mn, Nb, Si, Ta, Ti V, W, Zr, and mixtures thereof and wets at least about 40% of the superabrasive particle surface;

b) forming a mixture of coated superabrasive particles and organic binder over at least a portion of a metal wire, such that the coated superabrasive particles are in a single layer; and c) curing the organic binder to secure the coated superabrasive particles to the metal wire to form a superabrasive wire saw;

wherein the steps of coating the superabrasive particles, forming a mixture, and curing the organic binder are performed continuously as the metal wire is translated through a processing area.

* * * * *